Aug. 4, 1942.　　　E. H. FIFIELD ET AL　　　2,291,703
ADJUSTABLE CALENDAR
Filed Sept. 17, 1940

Inventors.
Earl Herbert Fifield.
Robert Wenham.

UNITED STATES PATENT OFFICE 2,291,703

ADJUSTABLE CALENDAR

Earl Herbert Fifield, Lawndale, and Robert Wenham, South Gate, Calif.

Application September 17, 1940, Serial No. 357,158

2 Claims. (Cl. 40—107)

The novel device being a hand-set date indicator, consists essentially of a group of links composed of suitable material constructed in any desired size and/or shape, bearing figures and/or other indications, permanently assembled to operate and/or adjust in and/or on a particular encircling principle to eliminate the necessity of detaching any part therefrom, the manner hereinafter fully described, illustrated in accompanying drawing and pointed out in the claims hereunto appended;

Hand-set date indicators have been made embodying cases containing cards that automatically change, and/or blocks assembled to show through an aperture, some or all require pivots, pins, grooves, stands, bases, slides, stops and frames, but none embody the principle of links permanently assembled to operate or adjust in the novel manner of the device hereinafter described that effects an improvement and eliminates all or most of aforesaid parts.

The aforesaid group of links consists of a connecting link and a plurality of indicator links which may be formed of any desired material. The improved calendar consists of a connecting link and indicator links adjustably mounted thereon.

Said openings of all links are of a desired length, width and depth to comply.

Figure 1:
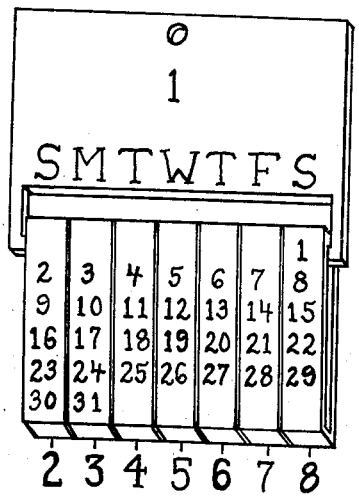
Figure 2:
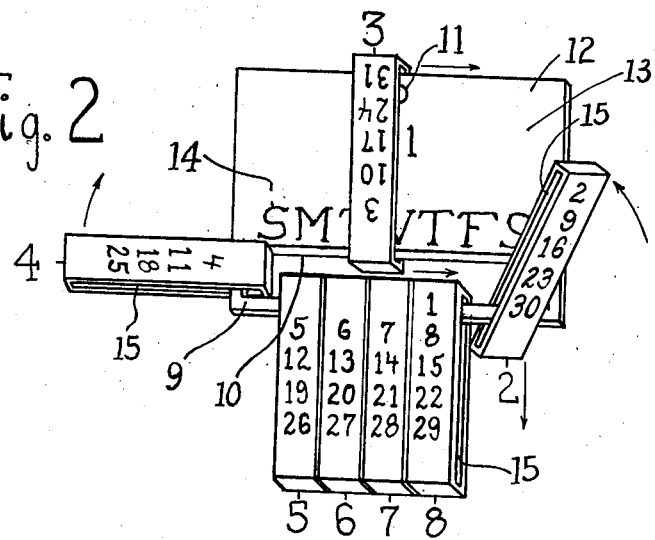

The following is a description with reference to the accompanying drawing in which:

Figure 1 is a vertical view of the complete calendar before adjustment; Fig. 2, a view of the calendar parts during adjustment; and Fig. 3, a vertical view of the complete calendar after adjustment.

Similar numerals refer to similar parts throughout the several views.

The invention consists essentially of a connecting link 1, which comprises a plate slotted along its lower portion to provide a U-bar 9, extending along the lower side and both ends of the slot 10, and a body portion 12, on the upper side of slot 10, said body portion having an aperture or hole 11, adapted to suspend the entire device effected by the insertion of or its slipping over a suitable suspension facility such as a nail, screw, hook, etc.; the same body portion 12, having a space or area 13, reserved for art and/or literature also a days of week indicia 14, marked thereon at the other or upper side of slot 10.

The complete connecting link 1, is adapted for the permanent mounting, operation and adjustment of a plurality of indicator links the latter being adapted to be slid to the right or to the left and alternately encircle the body portion 12 or the U-bar 9, moreover to rotate backward or foreward at right angles upon U-bar 9, said rotating motion limited to a half turn by the body portion 12, which automatically acts as a stop in this instance (see Fig. 2, link 2).

Each of the indicator links 2, 3, 4, 5, 6, 7 and 8, is composed of a suitable material to form a band link having a series of numerals marked on its opposed outer faces, one series being reversed or upside down on its rear outer face, each said link adapted with its opening 15, extending through its sides and terminating at a desired length and depth to permit its permanent mounting upon connecting link.

The aforesaid numerals arranged as follows two, nine, sixteen, twenty-three and thirty on link 2; three, ten, seventeen, twenty-four and thirty-one on link 3; four, eleven, eighteen and twenty-five on link 4; five, twelve, nineteen and twenty-six on link 5; six, thirteen, twenty and twenty-seven on link 6; seven, fourteen, twenty-one and twenty-eight on link 7; and one, eight, fifteen, twenty-two and twenty-nine on link 8; the readable or upright position of the series being horizontally lower on the one face of links 2, 3, 4, 5, 6 and 7; and the readable or upright position of the series being high on both faces of link 8, thereby permitting the kalends to fall on any day of week and maintain the rotation of the aforesaid numerals by the adjustments hereinafter pointed out.

Figure 3:
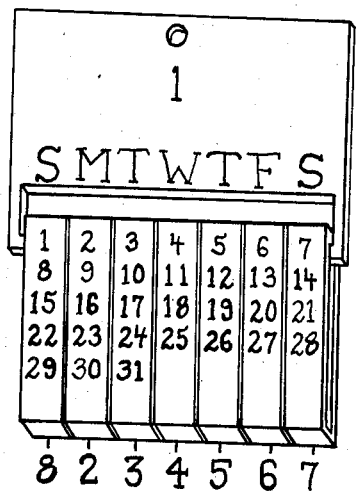

The features of the invention are carried out in the manner shown in Fig. 2, where it will be seen that link 2, is being rotated to bring the numerals from reverse to front position in line horizontally with the numerals on link 8, after the adjustments as shown by links 3 and 4, of which link 3 is being slid from the left to the right encircling the body portion 12 of link 1, after the adjustment as shown by link 4 the latter being slid from U-bar 9 onto body portion 12 of link 1, the remaining links 5, 6, 7 and 8 adjust as 2, 3 and 4; the result of an adjustment shown by changed position of links and numerals thereon in Fig. 3, in comparison with position of links and numerals thereon in Fig. 1.

The calendar is characterized by the novel adjustment feature namely that while the indicator links maintain their relative order they must be slid to the right or to the left to alternately encircle the body portion or the U-bar and moreover to rotate backward or foreward at right angles upon said U-bar to obtain any desired change.

Moreover while the device is to be utilized as a date indicator its use is not to be limited as such it being obvious that its principle may be employed for displaying other information.

Having explained in detail the construction and purpose of our invention we do hereby claim:

1. In an adjustable calendar the combination of a connecting link which comprises a body portion having an aperture for the suspension of the entire device, an area reserved for art and/or literature, a days of week indicia marked thereon, a slot providing a U-bar and a plurality of indicator links bearing a series of numerals on their opposed outer faces, each indicator link having an opening extending through its sides and being permanently mounted upon said connecting link, the opening in each indicator link being of such dimensions, that each such indicator link is capable of slidable and rotatable motion upon the U-bar and encircling motion about the body portion of the connecting link in order to obtain any desired change in the position of each indicator link with respect to the other links or in the position of the opposed outer faces of each indicator link.

2. A device according to the preceding claim wherein the connecting link and indicator links are so formed as to limit the rotatable motion of each of the indicator links to a half turn.

EARL HERBERT FIFIELD.
ROBERT WENHAM.